US00RE47928E

(19) United States
(12) Reissued Patent
Sanchez Gutierrez et al.

(10) Patent Number: US RE47,928 E
(45) Date of Reissued Patent: Apr. 7, 2020

(54) MEDIA DETECTION APPARATUS AND METHOD

(71) Applicant: Datamax-O'Neil Corporation, Orlando, FL (US)

(72) Inventors: Jose Fernando Sanchez Gutierrez, Orlando, FL (US); Ronald Schwallie, Lake Mary, FL (US)

(73) Assignee: DATAMAX-O'NEIL CORPORATION, Altamonte Springs, FL (US)

(21) Appl. No.: 15/586,455

(22) Filed: May 4, 2017

Related U.S. Patent Documents

Reissue of:
(64) Patent No.: 9,024,988
Issued: May 5, 2015
Appl. No.: 14/368,113
PCT Filed: Dec. 19, 2012
PCT No.: PCT/US2012/070605
§ 371 (c)(1),
(2) Date: Jun. 23, 2014
PCT Pub. No.: WO2013/096439
PCT Pub. Date: Jun. 27, 2013

U.S. Applications:
(60) Provisional application No. 61/579,258, filed on Dec. 22, 2011.

(51) Int. Cl.
*B41J 3/407* (2006.01)
*B41J 2/32* (2006.01)
*B41J 11/00* (2006.01)

(52) U.S. Cl.
CPC ..... *B41J 3/4075* (2013.01); *B41J 2/32* (2013.01); *B41J 11/0095* (2013.01)

(58) Field of Classification Search
CPC ..... B41J 3/4075; B41J 2/32; B41J 11/0095
USPC ..... 347/218; 400/708; 250/559.01, 559.1
See application file for complete search history.

(56) References Cited

U.S. PATENT DOCUMENTS 4,143,977 A 3/1979 Kurihara et al.
4,177,731 A 12/1979 Kleist et al.
4,788,558 A 11/1988 Caldwell et al.
4,788,559 A 11/1988 Ende
4,872,659 A 10/1989 Kato et al.
4,924,240 A 5/1990 Herbert et al.
4,991,846 A 2/1991 Sondej
(Continued)

*Primary Examiner* — Minh Nguyen
(74) *Attorney, Agent, or Firm* — Alston & Bird, LLP

(57) ABSTRACT

An apparatus and method for automatically calibrating a media sensor configured to detect advancing print media in a printing device. In some embodiments, the apparatus selects a first light intensity level and a second light intensity level greater than the first light intensity level. A light source unit, such as a light emitting diode or laser diode is activated to emit light at the second light intensity level. The light passes though print media, for example, a roll of self-adhesive labels, that is advanced along a print path of the printing device. The amount of light transmitted through the print media is measured as the print media advances. If the measured light [increases] *decreases*, the light source unit is reactivated to emit light at the first light intensity level. In some embodiments, the apparatus identifies whether print media has changed or an out-of-stock condition exists.

14 Claims, 5 Drawing Sheets

(56) References Cited

U.S. PATENT DOCUMENTS 5,028,155 A 7/1991 Sugiura et al.
5,087,137 A 2/1992 Burnard et al.
5,206,662 A 4/1993 Fox et al.
5,326,182 A 7/1994 Hagstrom
5,397,192 A 3/1995 Khormaee
5,438,349 A * 8/1995 Fox et al. ..... 346/136
5,468,076 A 11/1995 Hirano et al.
5,490,638 A 2/1996 Driftmyer et al.
5,564,841 A 10/1996 Austin et al.
5,600,350 A 2/1997 Cobbs et al.
5,650,730 A 7/1997 Herbst, Jr. ..... B65C 9/1869 324/663
5,684,516 A 11/1997 Cseledy et al.
5,693,931 A 12/1997 Wade
5,790,162 A 8/1998 Adams et al.
5,820,280 A 10/1998 Fox
5,836,704 A 11/1998 Lau et al.
5,870,114 A 2/1999 Numata et al.
5,872,585 A 2/1999 Donato et al.
5,874,980 A 2/1999 West
5,909,233 A 6/1999 Hamman et al.
5,927,875 A 7/1999 Lau et al.
5,978,004 A 11/1999 Ehrhardt
5,995,128 A 11/1999 Adams et al.
6,014,229 A 1/2000 Yun
6,020,906 A 2/2000 Adams et al.
6,034,708 A 3/2000 Adams et al.
6,057,870 A 5/2000 Monnier et al.
6,070,048 A 5/2000 Nonaka et al.
6,082,914 A 7/2000 Barrus et al.
6,095,704 A 8/2000 Jaeger et al.
6,099,178 A 8/2000 Spurr et al.
6,129,463 A 10/2000 Lau et al.
6,201,255 B1 3/2001 Torchalski et al.
6,283,024 B1 9/2001 George
6,289,730 B1 9/2001 Elgee
6,302,604 B1 10/2001 Bryant et al.
6,389,241 B1 5/2002 Cernusak et al.
6,396,070 B1 5/2002 Christensen et al.
6,520,614 B2 2/2003 Kaneko
6,616,362 B2 9/2003 Bouverie et al.
6,825,864 B2 11/2004 Botten et al.
6,840,689 B2 1/2005 Barrus et al.
6,846,121 B2 1/2005 Bouverie et al.
6,857,714 B2 2/2005 Ream et al.
6,900,449 B2 5/2005 Bolash et al.
6,942,403 B2 9/2005 Hohberger et al.
7,042,478 B2 5/2006 Bouverie et al.
7,071,961 B2 7/2006 Ullenius et al.
7,079,168 B2 7/2006 Ullenius et al.
7,150,572 B2 12/2006 McNestry et al.
7,162,460 B2 1/2007 Cleckler et al.
7,205,561 B2 4/2007 Chelvayohan et al.
7,255,343 B2 8/2007 So
7,375,832 B2 5/2008 Bouverie et al.
7,391,043 B2 6/2008 Ehrhardt, Jr. ..... B65C 9/42 250/559.29
7,456,995 B2 11/2008 Stephens
7,502,042 B2 3/2009 Hitz et al.
7,537,404 B2 5/2009 Bouverie et al.
7,600,684 B2 10/2009 Tobin et al.
7,667,874 B2 2/2010 MacDonald et al.
7,699,550 B2 4/2010 Bouverie et al.
7,824,116 B2 11/2010 Lyman
7,845,632 B2 12/2010 Windsor et al.
7,857,414 B2 12/2010 Eun et al.
7,876,223 B2 1/2011 Yamaguchi et al.
7,891,892 B2 2/2011 Chiu
7,907,159 B2 3/2011 Matsuo et al.
7,934,881 B2 5/2011 Lodwig et al.
7,938,501 B2 5/2011 Takamiya et al.
8,142,087 B2 3/2012 Kugimachi
8,573,869 B2 * 11/2013 Momose et al. ..... 400/611
2001/0008612 A1 7/2001 Liljestrand et al.
2003/0081024 A1 5/2003 Vives et al.
2003/0141655 A1 7/2003 Bryer
2004/0008365 A1 1/2004 Hobbs
2004/0114024 A1 6/2004 Bouverie et al.
2004/0165927 A1 8/2004 Fisher et al.
2005/0002715 A1 1/2005 Fries et al.
2005/0189693 A1 9/2005 Ko
2005/0190368 A1 9/2005 Ehrhardt et al.
2005/0204940 A1 9/2005 Elliott et al.
2006/0007295 A1 1/2006 Ueda
2006/0045601 A1 3/2006 Endo
2006/0055721 A1 3/2006 Burdette et al.
2006/0083572 A1 4/2006 Block et al.
2006/0157911 A1 7/2006 Learmonth et al.
2006/0159504 A1 7/2006 Blanchard et al.
2006/0180737 A1 8/2006 Consiglio
2007/0022233 A1 1/2007 Bridges et al.
2007/0040326 A1 2/2007 Noda et al.
2007/0059078 A1 3/2007 Silverbrook et al.
2007/0138738 A1 6/2007 Motohashi et al.
2009/0038495 A1 2/2009 Butzen et al.
2009/0103806 A1 4/2009 Nakami
2009/0244584 A1 10/2009 McGarry et al.
2010/0066782 A1 3/2010 Yamamoto et al.
2010/0169513 A1 7/2010 Levin
2010/0247222 A1 9/2010 Bouverie et al.
2010/0289845 A1 11/2010 Conway et al.
2010/0319561 A1 12/2010 Colquitt et al.
2011/0042883 A1 2/2011 Wang et al.
2011/0132643 A1 6/2011 Hattori et al.
2011/0200376 A1 * 8/2011 Oozawa ..... B41J 11/0095 11/95

* cited by examiner

MEDIA DETECTION APPARATUS AND METHOD

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

*CROSS-REFERENCE TO RELATED APPLICATIONS*

*This application is a broadening reissue application of U.S. Pat. No. 9,024,988, which claims the benefit of U.S. application Ser. No. 14/368,113, filed Jun. 23, 2014 and issued as U.S. Pat. No. 9,024,988 on May 5, 2015, which claims priority to PCT Application No. PCT/US2012/070605, filed Dec. 19, 2012, which claims priority to U.S. provisional Application No. 61/579,258, filed Dec. 22, 2011, each of which are hereby incorporated by reference herein in their entirety.*

BACKGROUND

1. Technical Field

The present disclosure generally relates to label printers, and, more particularly, to an improved apparatus and method for automatically sensing and setting label length in a label printer.

2. Background of Related Art

Labels are everywhere in our daily life and have many uses, for example, for the identification and tracking of products in the distribution chain, identification of laboratory samples, and for document and records identification. Almost every product, such as fruits, manufactured foods, electrical or mechanical equipment, books, consumer goods, etc., includes some form of label. Such labels may include graphic images, human-readable alphanumeric text, and machine-readable barcode. Many types of label media exist, and many techniques for printing labels are used. For example, thermal transfer techniques are widely used in modern industry.

Generally, two kinds of thermal label media are commonly used. One is a tag stock (no adhesive) type. In this type, the media itself includes multiple pages attached end-to-end and wound on into a roll. This tag stock type uses an index mark, index notch, or an index hole to delineate labels from each other. This delineation feature may be used to set a starting position for printing whereby a label printer indexes the printed image from the starting position as defined, directly or indirectly, by the delineation feature of the media.

Another popular type of media is a label type which has two layers: a backing (or liner) and a self-adhesive label attached to the backing. The self-adhesive labels are detached or peeled from the backing after printing, whereupon the label may be attached to the desired item.

Each type of media may use a particular technique for separating the labels from the roll as they advance out of the printer. For this purpose, the tag stock type provides several methods. One of them is perforations on boundaries of each label or tag. The perforation method provides boundaries for each label and makes it easy for a user to cleanly tear off a label form the roll. Other methods include a manual (e.g., serrated edge) or automatic cutting mechanism (e.g., guillotine), a notch, hole, or mark for each label at a starting position for printing.

Typically, a label printer must be manually calibrated to set a label starting position when a new supply of label media is loaded into the printer. Inaccurately setting the starting position by the user can cause printing problems such as poor registration, double feeding, and so forth, and as a result, waste labels and time. Thus, accurately setting a starting position for a label printer has substantial impact on the process of printing labels.

SUMMARY

Disclosed is a method of automatically calibrating a media sensor configured to detect advancing print media. In some embodiments in accordance with the present disclosure, the method includes operating a light-emitting unit *emitting* at least two light intensity levels: a first light intensity corresponding [relating] to the gap between labels, and a second light intensity that is greater than the first light intensity level relating to the label. The first and second light levels are selected such that a sufficient delta exists between the two levels to enable the detection of a transition between paper to gap, or gap to paper, as media advances through the print path. [A] *In some embodiments a* light source unit is activated to emit light at the second light intensity level, *and in some embodiments the method includes* measuring an amount of the emitted light that is transmitted through the print media, advancing the print media, and setting the light source unit to emit light at the first light intensity level in response to a determination that the light transmitted through the print media is [increasing] *decreasing*.

Also disclosed is a method of automatically calibrating a media sensor configured to detect advancing print media. In some embodiments in accordance with the present disclosure, the method includes selecting [at] a first light intensity level and a second light intensity level that is greater than the first light intensity level. [A] *In some embodiments a* light source unit is activated to emit light at the second light intensity level, *and in some embodiments the method includes* measuring an amount of the emitted light that is transmitted through the print media, advancing the print media, and setting the light source unit to emit light at the first light intensity level in response to a determination that the light transmitted through the print media is [increasing] *decreasing*.

In some embodiments, a position of the print media is recorded, and, in some embodiments, a position at which that the light transmitted through the print media increases or decreases is recorded.

In some embodiments, a measured amount of light transmitted through the print media is recorded.

In some embodiments, the disclosed method further includes determining whether a print media status has changed since a previous operation, determining whether an out-of-stock condition exists in response to determination that print media status has changed, signaling a fault condition in response to a determination that an out-of-stock condition exists. In some embodiments, determining whether a print media status has changed since a previous operation includes comparing a current measured amount of light transmitted through the print media with a previously measured amount of light transmitted through the print media.

In some embodiments, determining whether an out-of-stock condition exists includes comparing a measured amount of light transmitted through the print media to a predetermined out-of-stock value.

In another aspect, some embodiments of a label printer configured for automatic media calibration in accordance with the present disclosure include a media drive configured to advance label media from a media supply to a print head, a setting unit in operable communication with the media drive, a light source unit in operable communication with the setting unit, and a light detector unit in operable communication with the setting unit and configured to detect light emitted from the light source unit and transmitted at least in part through label media. The setting unit is configured to select a first light intensity level and a second light intensity level greater than the first light intensity level and to cause the light source unit to emit light at the second light intensity level. The setting unit is configured to measure the amount of the emitted light transmitted through the print media into the light detector unit, to cause the media drive to advance the print media, and to set the light source unit to emit light at the first light intensity level in response to a determination that the light transmitted through the print media is decreasing.

In some aspects, the setting unit is configured to select two intensity levels: a first "gap" light intensity level corresponding to a gap level, and a second "paper" light intensity level corresponding to paper level greater than the gap light intensity level, and to cause the light source unit to emit light at the paper light intensity level.

In some embodiments, a label printer in accordance with the present disclosure includes a print head in operable communication with the setting unit that is configured to imprint visible indicia upon a media label.

In some embodiments, the setting unit of a label printer in accordance with the present disclosure is configured to record a position of the print media. In some embodiments, the position of the print media is recorded by recording a position at which that the light transmitted through the print media increases or decreases. In some embodiments, the setting unit is further configured to record a measured amount of light transmitted through the print media.

In some embodiments, a setting unit in accordance with the present disclosure is configured to determine whether a print media status has changed since a previous operation, to determine whether an out-of-stock condition exists in response to determination that the print media status has changed, and to signal a fault condition in response to a determination that an out-of-stock condition exists. In some embodiments, the determination whether a print media status has changed since a previous operation includes comparing a current measured amount of light transmitted through the print media with a previously measured amount of light transmitted through the print media. In some embodiments, the determination of whether an out-of-stock condition exists includes comparing a measured amount of light transmitted through the print media to a predetermined out-of-stock value.

In some embodiments, a label printer in accordance with the present disclosure includes a communications interface operably coupled to the setting unit and configured to communicate via a protocol selected from the group consisting of a wired communication protocol or a wireless communication protocol. In some embodiments, a label printer in accordance with the present disclosure includes a media drive having a stepper motor.

The present disclosure also describes a method and an apparatus for automatically setting the starting position of the media for printing. In some embodiments, a label printer in accordance with the present disclosure includes a setting unit, a feeding unit, a light source unit [unit], and a light detecting unit. The setting unit sets a label starting position for the label printer when one or more conditions are met, as will be described in detail herein. The feeding unit feeds the media through the printer, e.g., from a supply of labels (typically a roll or fanfold supply), through a print path including a print head, and outward of the printer through an opening or slot provided in the printer housing. The feeding unit may include one or more drive motors configured to feed media through the printer. The light source unit emits light which passes through the label media, and the light detecting unit detects light transmitted through the label media. The detected light transitions from one range of light intensity to another range of light intensity as the media moves through the emitted light beam. The light source unit and the light detecting unit are aligned and placed opposite one another, and the media passes through the light beam such that the light detecting unit receives the varying levels of transmitted light detected after passing through the media. The light detecting unit can include a photovoltaic sensor, a photodiode, a phototransistor, or any suitable sensor that can detect light. In some embodiments, a photodiode is used for the light detecting unit, however, it is to be understood any suitable light detector unit may be employed.

In some embodiments, a reflective arrangement may be employed wherein the light source unit and light detector unit are positioned on the same side of the print media. Light source unit is configured to illuminate a region of the label media within the field of view of the light detector unit such that gap and paper light levels transitions are detected as the media advances through the field of view of the light detector unit.

Generally, the light detecting unit is configured to detect two differing ranges of light intensity *transmitted through two different portions of the print media*. [A first range is a] *One* range of light intensity *corresponds to light transmitted through the print media when* the label *portion of the print media* is [placed in] *positioned* between the light source unit and the light detecting unit. [A second range is a] *Another* range of light intensity *corresponds to light transmitted through the print media* when the liner *portion* of the media (*e.g., no label*) *or a gap*, perforations, *or* an index hole *between label portions* of the media, [or a gap between the label media (e.g., no layer) is placed in] *is positioned* between the light source unit and the light detecting unit. By this arrangement, the [first range of] light intensity detected *when the label portion of the media is positioned in between the light source unit and the light detecting unit* will be less than the [second range if] light intensity *detected when the liner portion of the media* (*e.g., no label*) *or a gap, perforations, or an intex hole between label portions of the media, is positioned in between the light source unit and the light detecting unit*, because the transmitted light may be partially or totally blocked by the label *portion of the* media. Conversely the [second range of] light intensity *detected when the liner portion of the media* (*e.g., no label*) *or a gap, perforations, or an index hole between label portions of the media, is positioned in between the light source unit and the light detecting unit* is greater than the [first range] *light intensity detected when the label portion of the media is positioned in between the light source unit and the light detecting unit,* since the *liner portion,* gap, notch, or space between labels permits more light to pass therethrough. After accounting for the intensity of the light emitted by the light source unit, and the sensitivity of the light detector unit, the ranges of detected light intensity are determined by the thickness or light transmissivity of media or labels.

In one aspect, the described method and apparatus will attempt automatic recalibration when it is determined that a new supply of media has been loaded into the printer. Advantageously, the disclosed method can adapt to the new media regardless of whether the new supply of the same type of media as was used immediately prior, or, a different type of media has been loaded. For example, if the new media demonstrates values outside the range of those seen with respect to the previously-loaded batch of labels (e.g., is an outlier compared to the range of overall light transmissivity values of previous labels), then calibration of the detecting unit is configured to automatically adjust the two ranges of light intensity with respect to the new label media's light transmissivity.

In another aspect, the light detecting unit sends a signal to the setting unit when it detects a range transition from one range to another range of light intensity of the light emitted *by the light source unit and transmitted* through the media, and, when the setting unit receives the signal two times, the setting unit sets the starting position of the media to be printed. When the setting unit sets the starting position for printing, the auto-calibration process is complete and the label printer can proceed to print labels without wasting many labels for adjustment, and without user interaction.

In the drawings, a flow chart is provided which illustrates auto-calibration for the label printer. Initially, after a label is printed, the light detecting unit detects the light transmitted though the label media, and transmits the value to the setting unit. The setting unit stores this light intensity value, which represents a transmissivity of the label media. The light intensity value is dependent upon the type of media in use, and the position of the media relative to the light beam. A motor associated with a feeding unit is stopped while the printer is waiting for a print or feed event. When the print or feed event occurs, the label printer checks whether the media was changed during the time since the motor previously stopped. Determination of media change is done by checking light intensity value. When the label printer receives a print event or a feed event, the light detecting unit detects light intensity through the media and checks whether the detected value is same as the stored value. If a change is detected between the two values, then it is determined that new media have been loaded into the label printer; or, if no change is detected, the label printer assumes that the loaded media to be the same as which was previously placed under the light source unit.

When it is determined that the media has changed, the label printer also checks whether the media is out of stock. If no more media remains in the label printer, then the label printer stops printing and displays a message indicating no more media is available. When there is media left to be printed, the label printer calibrates the light detecting unit to detect a gap or a liner of the media.

In some embodiments, predetermined values of light intensity for a gap *or liner part of the media* and *for* a [liner] *label* part [for] *of* the media are compared to measured values of light. In order to calibrate the light detecting unit, at first, the light source unit increases or decreases light intensity so that the light detecting unit can detect a predetermined value of light intensity for the gap or [the] liner *part of the media, and/or a predetermined value of light intensity for the label part of the print media*.

For convenience, it is assumed that a [liner] *label* part is placed under the light source unit in the beginning of the auto-calibration process. Thus, the light source unit increases or decreases the light intensity so that the detected value reaches a certain predetermined value designated for the [liner] *label* part. This invention, however, is not limited to this assumption, and can be extended to include other embodiments that assume a *liner or* gap part is placed under the light source unit in the beginning of *the* auto-calibration process, or that assume the light source unit emits light only with a predetermined level of light intensity and the light detecting unit detects a transition of light intensity between non-predetermined ranges of light intensity through the media.

The feeding unit now feeds the media by starting the motor until a range transition of light intensity through the media is detected.

When a range transition is detected, the label printer checks whether the transition is downward or upward. If it is a downward transition from the predetermined value for the paper/[liner] *label* part to a detected value at the time of the transition, the label printer updates the predetermined value for the *liner or* gap with the predetermined value for the paper/[liner] *label* part and the predetermined value for the [liner] *label part* with the detected value. When [a downward] *an upward* transition is detected, the calibration is not necessary and *the label printer* starts printing labels on the media.

More specifically, when an upward transition is detected by the light detecting unit, more light goes through the media to the light detecting unit, which [implies] *indicates* that a *liner or* gap part [is under] *has moved between* the light source unit [now] *and the light detecting unit as the media advanced*. In this way, the assumption that the paper/[liner] *label* part is placed under the light source unit in the beginning *of the auto-calibration process* has proved to be correct and no need exists to update the predetermined value for the liner *or gap* part[, e.g., update the light level to the gap level] *with the predetermined value for the paper/label part*.

On the other hand, when a downward transition is detected, less light is transmitted through the media to the light detecting unit, which indicates that [liner] *a label*/paper [is now positioned] *part has moved* between the light source unit and light [detector] *detecting unit as the media advanced*. In other words, [a liner part or label part is under the light source unit now while previously] there was *a liner part, a gap,* an index hole, notch, or perforation *between the light source unit and the light detecting unit* in the beginning of the auto-calibration process instead of the [liner (or label)] *label* part. In this event, the assumption made at the beginning [is] *of the auto-calibration process was* incorrect and the predetermined value for the [liner] *label/paper* part should be updated. The detected value at the transition becomes the predetermined value for the [liner] *label/paper* part.

The setting unit sets the location where a second transition occurs as the starting position for printing. If a downward transition occurs first, then an upward transition will follow when a gap part is fed under the light source unit. If an upward transition occurs first, then a downward transition will follow when a [liner] *label* part right after the gap part is fed under the light source. Thus, the second transition occurs at boundaries of the gap part, namely, starting and ending of the gap between labels. Since a [the] gap portion is not used for label printing, auto-calibration for setting a starting position for label printing is done when detecting the second transition. After printing a label and pausing the motor, the value of light that the light detecting unit detects at the time printing is completed is recorded. In this manner, a stored or recorded value can be compared with a detected value when the label printer restarts the auto-calibration process.

In another aspect, the light detecting unit provides an upward transition signal and a downward transition signal. If the setting unit receives one pattern of signals whereby an upward transition signal is received first and a downward transition signal second, then the setting unit sets the starting position for printing at the point at which it receives the second signal, e.g., the downward transition signal. This represents the location where the end of the gap portion or the start of the [liner] *label* portion is located. If the setting unit receives another pattern of signals, e.g., a downward transition signal first and an upward transition signal second, then the setting unit waits for a third signal, another downward transition signal, and sets the starting position for printing when it receives the *third signal, i.e., the* second downward transition signal. This represents the position where the end of the gap part or the start of the [liner] *label* part is located. In this way, the label printer sets the starting position for printing with precision. Embodiments in accordance with this disclosure, however, are not limited to this kind of label media and can be extended to other media whose starting position for printing is a place other than the end of gap part.

In some embodiments, it does not matter whether the media is a label type or tag stock type. If it is a label type, labels are attached on the media so that a label part has two layers and a boundary part is only one layer, the liner. When the label is under the light source unit at the beginning [the label], and the feeding unit feeds media, the light detecting unit detects an upward transition of light intensity when the boundary region passes through the light beam because the boundary part only has one layer (e.g., the liner) and thus the emitted light would pass through the boundary more readily than at the beginning. In the same sense, if the media is tag stock, perforations are along boundaries of the label, [an index mark,] or an index hole or slot is located on or near the boundary of each label. Thus, when the label is under the light source unit at its beginning, and the feeding unit feeds the media, the light detecting unit detects an upward transition of light intensity when the boundary part, the perforations along the boundaries, [and index mark,] or the index hole *or slot*, is fed under the light source unit because most of the emitted light would pass through directly to the light detecting unit. Therefore, embodiments of the present disclosure may be applied to both types of labels in a similar manner.

By continuously monitoring the light detecting unit levels, the intensity of the light source unit (e.g., LED current or the transistor gain) can be adjusted to assure that there is adequate differences in the levels to accurately detect range transitions and the start of a new label or tag. Detecting the levels at the end of media motion and start of motion the printer can determine if additional calibration is required.

In another aspect, a sensor apparatus for a label printer is disclosed. The disclosed sensor apparatus includes a feeding unit configured to feed media of labels, a setting unit configured to set a starting position of each label of the media for the label printer, a light source unit configured to emit light through the media, and a light detecting unit configured to detect a range transition of light intensity through the media between a first range and a second range of light intensity of the emitted light, and send a signal to the setting unit when the range transition is detected, wherein the first range is lower than the second range, and the setting unit sets the starting position of each label of the media for the label printer when the setting unit receives a second signal from the light detecting unit.

In yet another aspect, a method of automatic setting for a label printer is disclosed. The disclosed method include feeding media of labels, emitting light on the media, detecting a range transition of light intensity through the media between a first range and a second range of light intensity of the emitted light, sending a signal when the range transition is detected, receiving the signal, and setting a starting position of the media for the label printer when receiving the signal receives a second signal.

BRIEF DESCRIPTION OF THE DRAWINGS

The above and other aspects, features, and advantages of the present disclosure will become more apparent in light of the following detailed description when taken in conjunction with the accompanying drawings in which.

DETAILED DESCRIPTION

Figure 1:
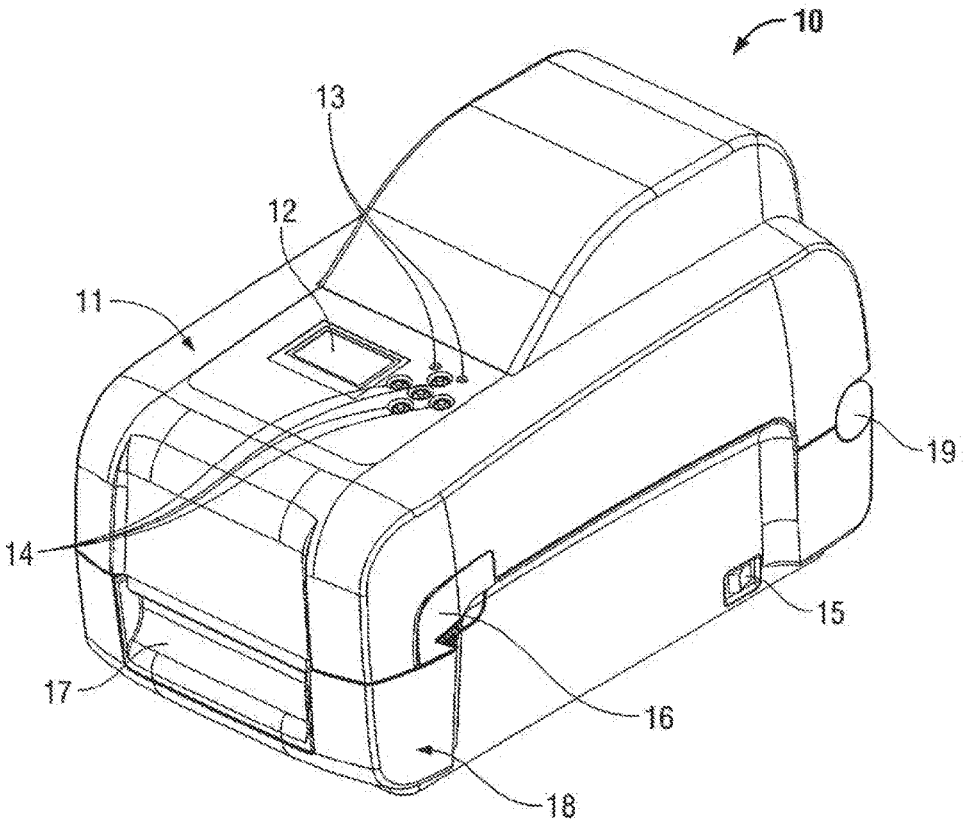
FIG. 1 shows an embodiment of a compact printer in accordance with the present disclosure having a top cover in a closed position.

Particular embodiments of the present disclosure are described hereinbelow with reference to the accompanying drawings; however, it is to be understood that the disclosed embodiments are merely examples of the disclosure, which may be embodied in various forms. Well-known and/or repetitive functions and constructions are not described in detail to avoid obscuring the present disclosure in unnecessary or redundant detail. Therefore, specific structural and functional details disclosed herein are not to be interpreted as limiting, but merely as a basis for the claims and as a representative basis for teaching one skilled in the art to variously employ the present disclosure in virtually any appropriately detailed structure. In addition, as used herein, terms referencing orientation, e.g., "top", "bottom", "up", "down", "left", "right", "clockwise", "counterclockwise", and the like, are used for illustrative purposes with reference to the figures and features shown therein. It is to be understood that embodiments in accordance with the present disclosure may be practiced in any orientation without limitation. In this description, as well as in the drawings, like-referenced numbers represent elements which may perform the same, similar, or equivalent functions.

Figure 2:
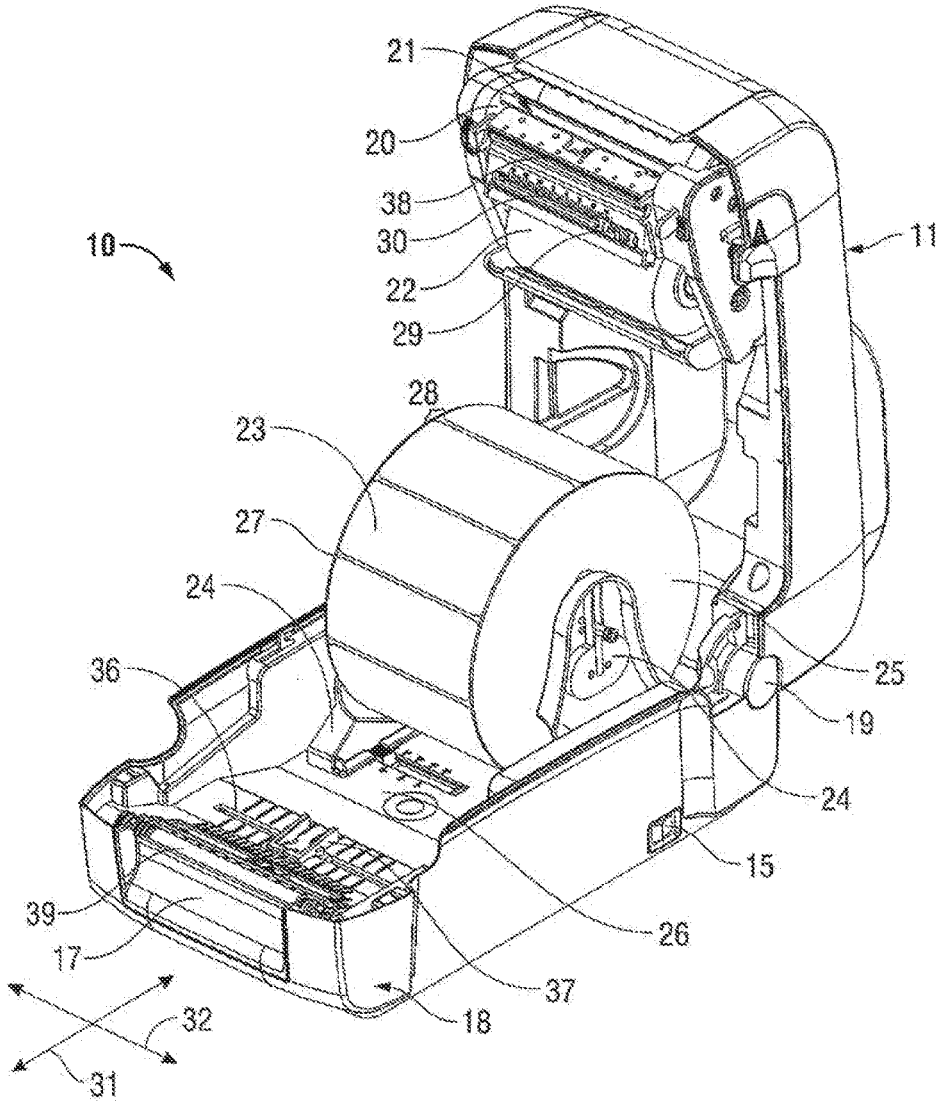
FIG. 2 shows the FIG. 1 embodiment of a compact printer having a top cover in an open position.
Figure 2A:
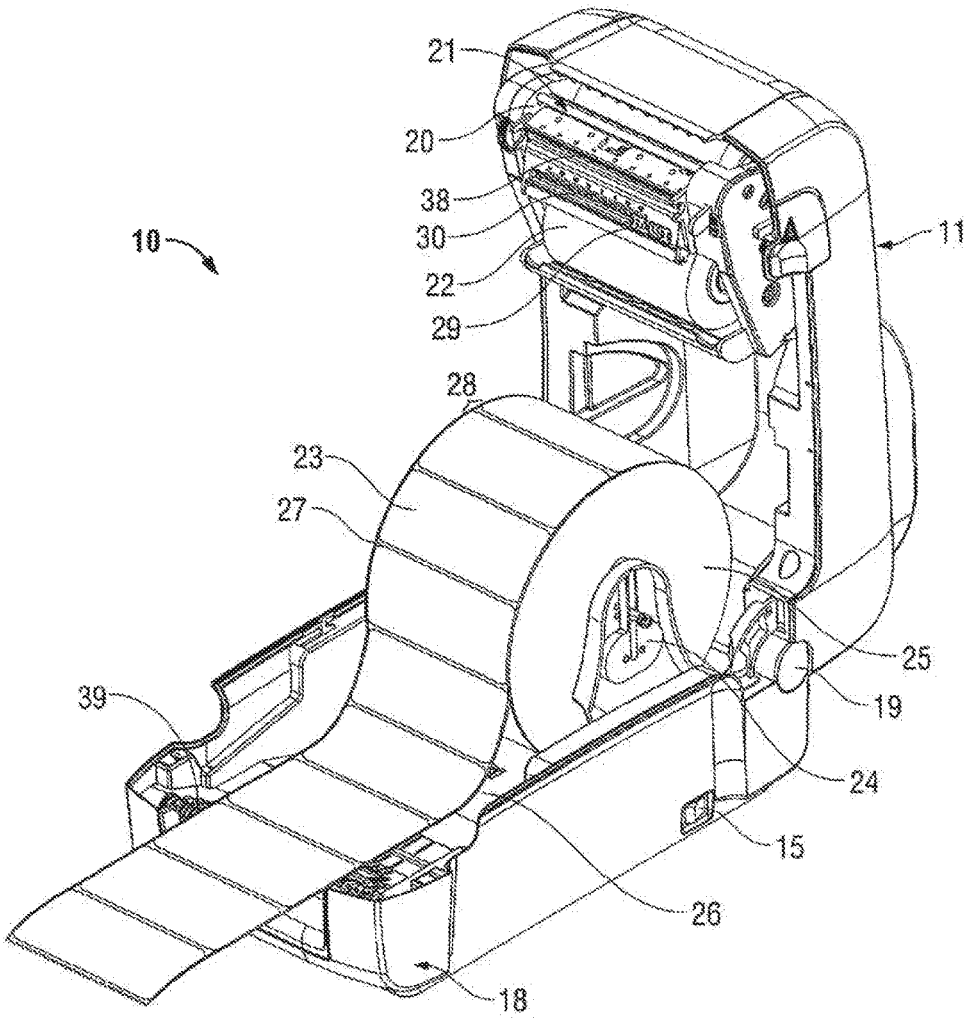
FIG. 2A shows the FIG. 1 embodiment of a compact printer having a top cover in an open position and media positioned along a print path.

FIGS. 1, 2, and 2A present an example embodiment of a printer 10 in accordance with the present disclosure. The printer 10 includes a bottom housing 18 and a selectively positionable top cover 11 that may be positioned in a closed position as shown in FIG. 1 and an open position as shown in FIG. 2. Top cover 11 and bottom housing 18 are pivotably joined by a hinge 19. Top cover 11 includes a user interface panel 12, one or more user input devices 14, and one or more indicators 13. User interface panel 12 many be any suitable form of display panel, including without limitation an LCD screen. User input device 14 may be any suitable form of input device, e.g., a snap dome or membrane pushbutton switch. Indicator 13 may be any suitable indicator, such as without limitation a light-emitting diode (LED). Indicator 13 may illuminate to indicate the status an operational parameter, e.g., power, ready, media empty, media jam, self test, and the like. Printer 10 includes a power switch 15. A pair of latches 16 are disposed on either side of top cover 11 to retain top cover 11 in a closed position, and may be disengaged using finger pressure to facilitate opening of top cover 11. A media slot 17 is defined in bottom housing 18 and provides a point of egress for media, which may be advantageous with self adhesive labels whereby the labels peel away from the substrate upon exiting the printer.

Top cover 11 includes a print frame assembly 20 (see FIG. 2) pivotably mounted therein. Print frame assembly 20 includes a ribbon supply 22 and a ribbon take up spool 21 that are arranged to supply transfer ribbon (not explicitly shown) across a print head assembly 38. A pair of media support members 24 extend from a print bed 26 and are adjustable across a lateral axis 32 of the printer 10 to accommodate a print media supply 25 of various widths. Print media 25 includes a plurality of labels 23, which may be self-adhesive style labels, releasably disposed on a backing material 27. Each label 23 is separated from the adjacent label 23 by an inter-label gap 28 at which the backing material 27 is exposed. A media drive 39 is configured to advance labels 23 from media supply 25, to a print head assembly 38, and through media slot 17. During use, labels 23 feed from print media supply 25 along the print bed 26 along a longitudinal axis 31 of the printer 10. A light detector unit 37 is positioned on print bed 26. In the present embodiment, light detector unit 37 rides in a transverse slot 36 defined in print bed 26 to enable selective positioning of light detector unit 37 along the lateral axis 32, however, in other embodiments light detector unit 37 may be positioned at a fixed location. A light source unit 29 is positioned on print head assembly 38. In the present embodiment, light source unit 29 rides in a transverse slot 30 defined in print head assembly 38 to enable selective positioning of light source unit 27 along the lateral axis 32, however, in other embodiments light source unit 29 may be positioned at a fixed location. Light detector unit 37 and light source unit 29 are arranged such that, when top cover 11 is positioned in a closed position, a light beam emitted from light source unit 29 is aligned with light detector unit 37. In some embodiments, light source unit 29 may provide a relatively narrow, focused beam while in other embodiments, light source unit 29 may provide a wide or ribbon-like beam spanning laterally across at least a portion of the print media supply. In yet other embodiments, light detector unit 37 may provide a relatively narrow light sensing regions while in still other embodiments, light detector unit 37 may provide a wide or ribbon-like light sensing region spanning laterally across at least a portion of the print media supply.

Figure 3:
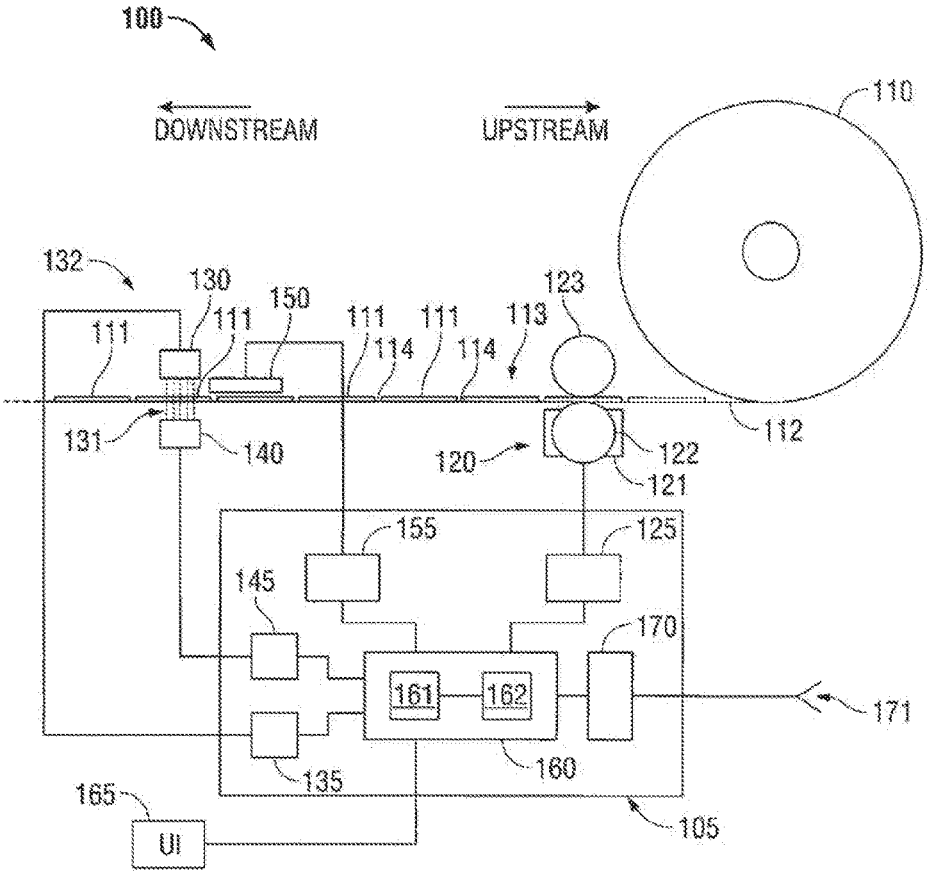
FIG. 3 is a schematic diagram of an embodiment of a media detection system in accordance with the present disclosure.

Turning now to FIG. 3, an embodiment of a printing system 100 in accordance with the present disclosure includes a media supply 110 that includes label media 113 having a plurality of labels 111 disposed on a backing 112. The labels 111 are separated by a gap 114 at which the backing 112 is exposed. In the present embodiment media supply 110 is shown as roll or web media, but it is to be understood that other types of media supplies may be successfully utilized by a printing system in accordance with the present invention, such as without limitation, fanfold media. In some embodiments, media supply 110 may include tag or card stock which does not require backing 112, and in these embodiments no backing is exposed at gap 114 and instead gap 114 is defined by a notch or other similar feature that separates labels 111. Printing system 110 includes a media drive 120 that is configured to advance label media 113 from media supply 110 to a print head assembly 150. In the illustrated embodiment, media drive 120 includes a motor 121 having an output shaft operably coupled to a drive roller 122 that is configured to mechanically engage media 113 to impart advancing motion thereto. In some embodiments, drive roller 122 is frictionally engaged with media 133. In some embodiments, drive roller 122 may include a pin feed arrangement whereby one or more mechanical features (not explicitly shown) project radially from drive roller 122 to engage corresponding openings provided by media 113, e.g., along one or both edges of media 113. Media drive 120 may include a pinch roller 123 that is configured to assist or enhance positive mechanical engagement between media 113 and drive roller 122. While in the presently illustrated embodiment media drive 120 is disposed upstream of print head assembly 150 (e.g., between media supply 110 and print head assembly 150 whereby media drive 120 pulls media from media supply 110 and pushes media toward print head assembly 150), in other embodiments media drive 120 may be positioned on the downstream side of print head assembly 150 whereby media drive 120 pulls media through print head assembly 150 and from media supply 110.

Print head assembly 150 is configured to imprint visible indicia upon media 113, and includes one or more print elements (not explicitly shown) which may include, without limitation, a thermal transfer element, an ink transfer element, a mechanical print element (e.g., dot matrix, impact print elements, etc.) and the like. In some embodiments, print head assembly 150 includes a plurality of individually addressable thermal heating elements (not explicitly shown). Printer 100 includes a media detection unit 132 that includes a light source unit 130 configured to direct a light beam 131 though media 113 towards a light detecting unit 140. As shown in the present embodiment, media detection unit 132 is positioned downstream of and substantially adjacent to print head assembly 150, while in other contemplated embodiments, media detection unit 132 may be positioned upstream of print head assembly 150 and/or may be positioned substantially apart from print head assembly 150.

Print system 100 includes a setting unit 105, which includes a number of features that interoperate with the aforedescribed elements. Setting unit 105 includes a controller 160 that includes in operative communication a processor 161 and a memory 162. Memory 162 may include volatile memory (e.g., RAM) and may include non-volatile and/or non-transitory memory (e.g., ROM, EPROM, EEPROM, flash memory, disk memory, and the like). Setting unit 105 includes a communications interface 170 in operable communication with controller 160 that is configured to facilitate the communication of operational data to and from print system 100 via a communications ports 171. Communications interface 170 may be configured to communicate via any one or a combination of wired or wireless communication protocols, including without limitation USB, IEEE 1394 "Firewire", serial (RS-232, RS-422, RS-485, and so forth), parallel IEEE 1284 "Centronics", Ethernet, TCP/IP, 802.11 wireless ("WiFi"), Bluetooth, or any other communication protocol now or in the future known. Communicated data may include, without limitation, label data, formatting data, printer status, media status, environmental data, font data, barcode data, quantity data, handshaking, and so forth, communicated to and from a host machine, application server, etc. Communicated data may include data generated by a software program, e.g., a label generation application or submodule. Print system 100 includes a user interface panel 165 in operable communication with controller 160 that may include visual and audio indicators.

Setting unit 105 includes a number of interface modules adapted to facilitate communication between controller 160 and other components of printer 100. Light source interface 135 enables communication between controller 160 and light source unit 130, and may include circuitry configured to vary the intensity and/or color of light emitted by light source unit 130 under the direction of an algorithm. In some embodiments, such an algorithm may be executed by processor 161. In some embodiments, light source interface 135 may include, without limitation, at least one of a constant current source, a digital-to-analog (D/A) converter, or a pulse-width modulator. In some embodiments, light source interface 135 may include a sensing circuit configured to sense an operating parameter of light source unit 130, e.g., operating current, resistance, output level, etc. Light source interface 135 may include a circuitry configured to provide power to light source unit to effectuate operation thereof.

Setting unit 105 includes light detector interface 145 that enables communication between controller 160 and light detector unit 140, and may include circuitry configured to condition, read, sample, convert, digitize and/or scale a signal received from light detector unit 140 for use by controller 160. In some embodiments, light detector interface 145 may include an analog-to-digital (A/D) converter, a power circuit configured to provide power to light detector unit 140. For example, light detector interface 145 may include circuit elements configured to bias a phototransistor (not explicitly shown) in the proper operating region to facilitate the effective detection of light beam 131. During use, as labels 111 and/or gaps 114 pass between light source unit 130 and light detector unit 140, light beam 131 is interrupted and/or modulated and the varying light is detected by light detector unit 140.

Setting unit 105 includes a print head interface 155 that enables communication between print head assembly 150 and controller 160. Print head interface 155 may include one or more drivers that are configured to provide power to the one or more print elements of print head assembly 150, and additionally or alternatively may include circuitry configured to communicate one or more operational and/or identification parameters with print head 150. For example, and without limitation, print head assembly 150 and/or print head interface 155 may be configured to communicate an operating temperature, an authentication code, a print command, and the like.

Setting unit 105 includes a media drive interface 125 that is configured to provide drive signals to media drive 120 and/or to receive one or more sensor signals from media drive 120 for conveyance to controller 160. For example, and without limitation, in some embodiments where media drive 120 includes a stepper motor 121, media drive interface 125 may include a stepper motor driver circuit configured to provide a full step drive signals, half step drive signals, wave drive signals, and/or microstepping signals. In some embodiments, embodiments where media drive 120 includes a servo motor 121, media drive interface 125 may include a servo driver circuit, and a feedback circuit configured to communicate positional (e.g., rotational) information to controller 160. Other forms of drive signals are contemplated to accommodate any suitable media drive arrangement, e.g., linear steppers, brushless motors, commutator motors, DC motors, AC motors, and so forth.

Figure 4:
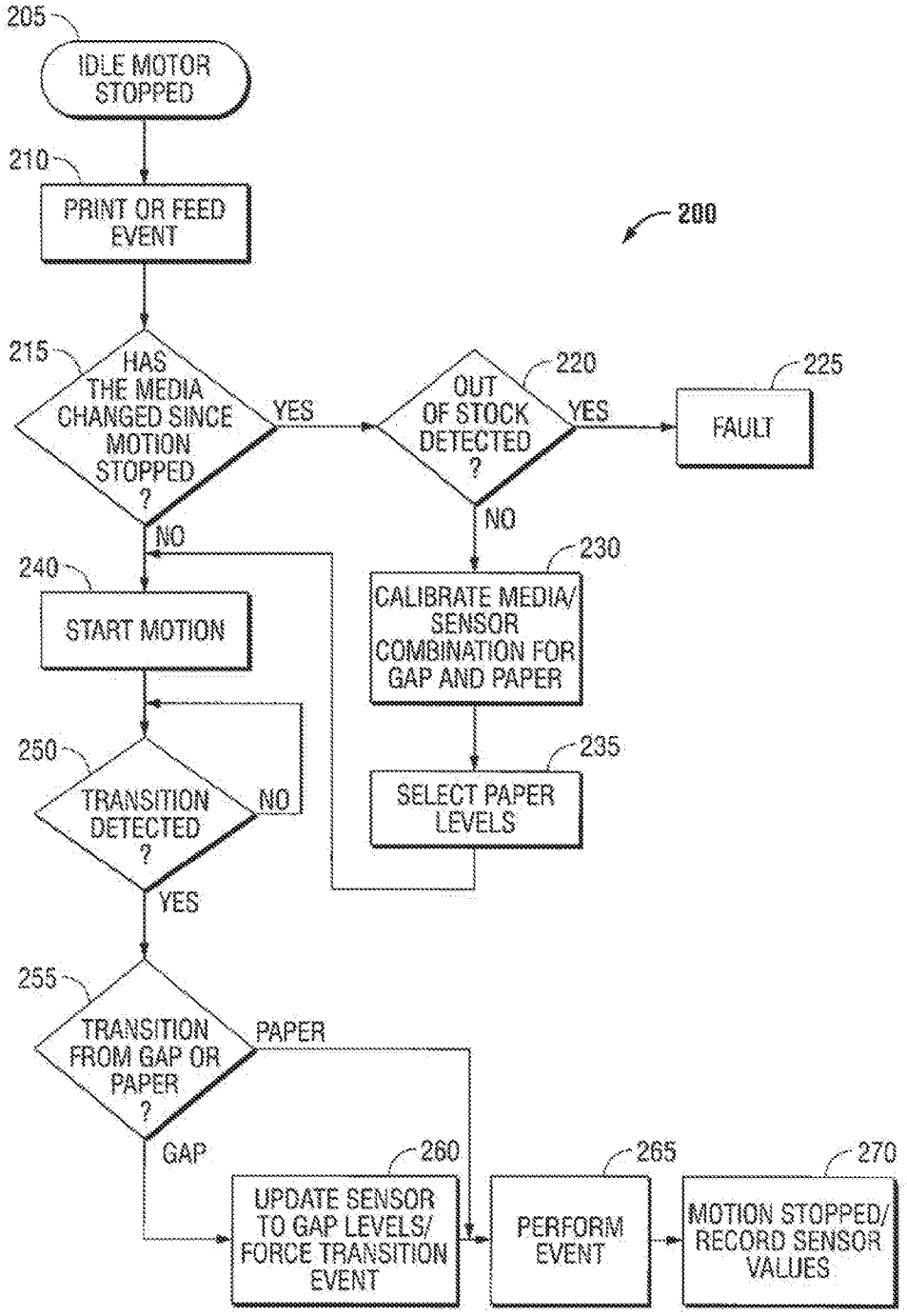
FIG. 4 is a flowchart illustrating a method of media detection in accordance with the present disclosure.

Considering now FIG. 4, a method 200 for automatically sensing and setting label length in a label printer is illustrated. In step 205, the printer is idle and ready to perform an operation such as a print event (e.g., a print command incorporating media feeding substantially concurrently with printing indicia thereupon) or a feed event (e.g., a form-feed command to advance print through the printer). In step 210 a print event or a feed event occurs (e.g., a print command or a feed command is received by the printer). Prior to executing the command, in step 215 a determination is made as to whether the print media has been changed since the last operation, which indicates that media calibration is required. In some embodiments, a light measurement MCURRENT is taken by light detector unit 140 and compared to a measurement MPREV taken at the conclusion of a prior print or feed event. If the two values are equal (or, in some embodiments, within a predetermined tolerance), it is determined that the print media has not changed. If, however, the two values are unequal (or, in some embodiments, outside a predetermined tolerance), or if no such previous measurement is available, it is determined the print media has changed.

If, in step 215 it has been determined that the print media has changed, then in step 220 a determination is made as to whether an out-of-stock condition exists (e.g., end of roll or no media installed). In some embodiments, a light measurement is taken by light detector unit 140 and compared to a predetermined out-of-stock value. In some embodiments, the predetermined out-of-stock value is commensurate with a value corresponding to an unobstructed light path 131 existing between light source unit 130 and light detector unit 140. If, in step 225 it is determined an out-of-stock condition exists, then in step 225 a fault condition is indicated. In some embodiments, a fault indication may include presenting an alarm to the user indicating that a new supply of label media needs to be loaded; such an alarm may include without limitation, a visual indication and/or an audible indication. In some embodiments, an out-of-stock status may be communicated via communication interface 170.

If, however, no out-of-stock condition is detected in step 220, e.g., a portion of label media 113 is positioned between light source unit 130 and light detector unit 140, in step 230 a media calibration is undertaken. Two preliminary light intensity levels for light source unit 130 are chosen to accommodate the two different portions of the label: a first, lower, light level L1 corresponding to the gap 114 and a second, higher light level L2 corresponding to the label 111. In some embodiments, the values of L1 and L2 can be reversed (e.g., L1 is assigned the higher level and L2 is assigned the lower level. The distinct values of L1 and L2 enable light detector unit 140 to detect a transition between gap 114 and label 111 as label media 113 advances through print system 100.

Once the two levels L1 and L2 have been determined, in step 235 light source unit 130 is set at the higher (L2) level, and in step 240, label media 113 is advanced (e.g., to execute a print operation or feed operation). By initially setting the light source unit 130 level to L2 (e.g., higher), an assumption is made that the light source unit 130 is calibrated to provide the expected light transmission though the label 111 portion of label media 113, therefore, a light *transmission* level *is expected to* transition from [high to low is expected] *a predetermined value to a higher detected value* when a gap 114 is reached.

Once label media 113 is in motion, light detector unit 140 detects the light beam 131 passing through label media 113. The output of light detector unit 140 is monitored, preferably in a substantially continuous manner in step 250, to determine whether the level of detected light [rises from a low level to a higher level] *increases from a predetermined value to a higher detected value* (as expected per the assumption set forth above), or [falls from a lower level to an even lower level] *decreases from a predetermined value to a lowe detected value* (in contravention of the assumption).

If, in step 255, it is determined that the level of detected light [rises from a low level to a higher level] *increases from a predetermined value to a higher detected value*, then the assumption was correct. That is, initially, a [gap 114] *label portion 111* was positioned within light beam 131, *blocking some or all of light beam 131 and lowering the level of light detected by light detector unit 140,* and subsequently a [label 111] *gap 114* passed into the beam, [occluding some of all of] *allowing more light from* light beam 131 *to transmit through the gap 114* and [lowering] *increasing* the level of light detected by light detector unit 140. In this case, the current output level L2 of light source unit 130 is maintained, and the process continues with step 265 as discussed below.

If, on the other hand, in step 255 it is determined that the level of detected light decreases from a [low level to a lower level] *predetermined value to a lower detected value*, then the assumption was incorrect in that, initially, a gap 114 was positioned within light beam *131* and subsequently a label 111 *portion* passed into the beam, thus decreasing the level of light detected by light detector unit 140. In this scenario, the position of the label 111 transition (edge) is recorded, step 260 is performed wherein output level of light source unit 130 is changed to L1 (e.g., lowered).

The process continues with step 265 wherein the position of the label 111 transition (edge) is recorded and the commanded operation is performed (e.g., a print command, a feed command, etc.). After the commanded operation is completed, the label media 113 is advanced until the next gap 114 is positioned in the light beam 131 (e.g., positioned at the start of the next label 111). Then, in step 270, a light measurement MPREV is taken at the conclusion of the commanded operation for use during the next commanded operation, as described above.

Advantageously, a printer according to the present disclosure includes the capability to automatically adjust and adapt to a wide variety of media supplies, particularly those of various lengths, of various label stock and arrangements, and of various light transmissivity.

While several embodiments of the disclosure have been described and shown in the drawings, it is not intended that the disclosure be limited thereto, as it is intended that the disclosure be as broad in scope as the art will allow and that the specification be read likewise. Therefore, the above description should not be construed as limiting, but merely as examples of particular embodiments. Those skilled in the art will envision other modifications within the scope and spirit of the claims appended hereto.

What is claimed is:

1. A method of automatically calibrating a media sensor configured to detect advancing print media, the method comprising:

selecting a first light intensity level and a second light intensity level greater than the first light intensity level;

setting a light source unit to emit light at the second light intensity level;

measuring an amount of the emitted light that is transmitted through the print media;

advancing the print media; and;

setting the light source unit to emit light at the first light intensity level in response to a determination that the light transmitted through the print media is [increasing] *decreasing*.

2. The method in accordance with claim 1, further comprising recording a position of the print media.

3. The method in accordance with claim 2, wherein recording a position of the print media includes recording a position at which that the light transmitted through the print media increases or decreases.

4. The method in accordance with claim 1, further comprising recording a measured amount of light transmitted through the print media.

5. The method in accordance with claim 1, further comprising:

determining whether a print media status has changed since a previous operation;

determining whether an out-of-stock condition exists in response to determination that print media status has changed; and signaling a fault condition in response to a determination that an out-of-stock condition exists.

6. The method in accordance with claim 5, wherein determining whether a print media status has changed since a previous operation includes comparing a current measured amount of light transmitted through the print media with a previously measured amount of light transmitted through the print media.

7. The method in accordance with claim 1, wherein determining whether an out-of-stock condition exists includes comparing a measured amount of light transmitted through the print media to a predetermined out-of-stock value.

[8. A label printer configured for automatic media calibration, the printer comprising:

a media drive configured to advance label media from a media supply to a print head;

a setting unit in operable communication with the media drive;

a light source unit in operable communication with the setting unit;

a light detector unit in operable communication with the setting unit and configured to detect light emitted from the light source unit and transmitted at least in part through label media;

wherein the setting unit is configured to:

select a first light intensity level and a second light intensity level greater than the first light intensity level;

cause the light source unit to emit light at the second light intensity level;

measure the amount of the emitted light transmitted through the print media into the light detector unit;

cause the media drive to advance the print media; and set the light source unit to emit light at the first light intensity level in response to a determination that the light transmitted through the print media is decreasing.]

[9. The label printer in accordance with claim 8, further comprising a print head in operable communication with the setting unit and configured to imprint visible indicia upon a media label.]

[10. The label printer in accordance with claim 8, wherein the setting unit is further configured to record a position of the print media.]

[11. The label printer in accordance with claim 10, wherein a position of the print media is recorded by recording a position at which that the light transmitted through the print media increases or decreases.]

[12. The label printer in accordance with claim 8, wherein the setting unit is further configured to record a measured amount of light transmitted through the print media.]

[13. The label printer in accordance with claim 8, wherein the setting unit is further configured to:

determine whether a print media status has changed since a previous operation;

determine whether an out-of-stock condition exists in response to determination that the print media status has changed; and signal a fault condition in response to a determination that an out-of-stock condition exists.]

[14. The label printer in accordance with claim 13, wherein the determination whether a print media status has changed since a previous operation includes comparing a current measured amount of light transmitted through the print media with a previously measured amount of light transmitted through the print media.]

[15. The label printer in accordance with claim 8, wherein the determination of whether an out-of-stock condition exists includes comparing a measured amount of light transmitted through the print media to a predetermined out-of-stock value.]

[16. The label printer in accordance with claim 8, further comprising a communications interface operably coupled to the setting unit and configured to communicate via a protocol selected from the group consisting of a wired communication protocol or a wireless communication protocol.]

[17. The label printer in accordance with claim 8, wherein the media drive includes a stepper motor.]

*18. A method of automatically calibrating a media sensor configured to detect advancing print media, the method comprising:*

*selecting a first light intensity level for a light source unit corresponding to gap or liner portions of a print media, the first light intensity level selected to allow a light detecting unit to detect a first predetermined value of light when transmitted through the gap or liner portions of a print media;*

*selecting a second light intensity level for the light source unit corresponding to label portions of the print media, the second light intensity level selected to allow the light detecting unit to detect a second predetermined value of light when transmitted through the label portions of the print media, the second light intensity level greater than the first light intensity level;*

*setting the light source unit to emit light at the second light intensity level, based at least in part on an assumption that initially a label portion of the print media will be located between the light source unit and the light detecting unit;*

*advancing the print media and detecting a transition in light intensity from one of the first and second predetermined values of light to a detected value of light transmitted through the print media; and*

*ascertaining that initially a label portion of the print media was located between the light source unit and the light detecting unit if the transition from the predetermined value to the detected value reflects an increase in the light transmitted through the print media, and/or ascertaining that that, rather than a label portion, initially a gap or a liner portion of the print media was located between the light source unit and the light detecting unit if the transition from the first predetermined value corresponding to the second light intensity level to the detected value reflects a decrease in the light transmitted through the print media.*

*19. The method of claim 18, further comprising:*

*setting the light source unit to emit light at the first light intensity level if the transition from the first predetermined value to the detected value reflects a decrease in the light transmitted through the print media, the decrease indicating that, rather than a label portion, initially a gap or a liner portion of the print media was located between the light source unit and the light detecting unit.*

*20. The method of claim 18, further comprising:*

*recording a position of the print media corresponding to the transition from the first predetermined value to the detected value, the position representing a label edge;*

*performing a first print command or feed command;*

*advancing the print media until light detected by the light detecting unit corresponds to the first predetermined value of light transmitted through the gap or liner portions of the print media.*

*21. The method of claim 20, further comprising recording a measured amount of light detected by the light detecting unit at the conclusion of the first print command or feed command.*

*22. The method of claim 21, further comprising: ascertaining whether the print media has been changed prior to performing a second print command or feed command, at least in part by comparing a measured amount of light detected by the light detecting unit upon receiving the second print command or feed command to the measured amount of light detected by the light detecting unit at the conclusion of the first print command or feed command.*

*23. The method of claim 22, further comprising:*

*upon ascertaining that the print media has been changed, prior to performing the second print command or feed command:*

*setting the light source unit to emit light at the second light intensity level, based at least in part on an assumption that initially a label portion of the print media will be located between the light source unit and the light detecting unit;*

*advancing the print media and detecting a transition in light intensity from the second predetermined value corresponding to the second light intensity level to a detected value of light transmitted through the print media; and*

*ascertaining that initially a label portion of the print media was located between the light source unit and the light detecting unit if the transition from the second predetermined value to the detected value reflects an increase in the light transmitted through the print media, and/or ascertaining that that, rather than a label portion, initially a gap or a liner portion of the print media was located between the light source unit and the light detecting unit if the transition from the first predetermined value to the detected value reflects a decrease in the light transmitted through the print media.*

*24. A method of automatically calibrating a media sensor configured to detect advancing print media, the method comprising:*

*selecting a first light intensity level for a light source unit corresponding to gap or liner portions of a print media, the first light intensity level selected to allow a light detecting unit to detect a first predetermined value of light when transmitted through the gap or liner portions of a print media;*

*selecting a second light intensity level for the light source unit corresponding to label portions of the print media, the second light intensity level selected to allow the light detecting unit to detect a second predetermined value of light when transmitted through the label portions of the print media, the second light intensity level greater than the first light intensity level;*

*setting the light source unit to emit light at the second light intensity level, based at least in part on an assumption that initially a label portion of the print media will be located between the light source unit and the light detecting unit;*

*advancing the print media and detecting a transition in light intensity from one of the first and second predetermined values of light to a detected value of light transmitted through the print media; recording a position of the print media corresponding to the transition from the first predetermined value to the detected value, the position representing a label edge;*

*performing a first print command or feed command;*

*advancing the print media until light detected by the light detecting unit corresponds to the first predetermined value of light transmitted through the gap or liner portions of the print media; and*

*ascertaining that initially a label portion of the print media was located between the light source unit and the light detecting unit if the transition from the predetermined value to the detected value reflects an increase in the light transmitted through the print media, and/or ascertaining that that, rather than a label portion, initially a gap or a liner portion of the print media was located between the light source unit and the light detecting unit if the transition from the first predetermined value corresponding to the second light intensity level to the detected value reflects a decrease in the light transmitted through the print media.*

* * * * *